(12) United States Patent
Okawa et al.

(10) Patent No.: US 6,397,233 B1
(45) Date of Patent: *May 28, 2002

(54) DOCUMENT PROCESSING APPARATUS AND COMPUTER PROGRAM PRODUCT THEREFOR

(75) Inventors: Toru Okawa; Ryuichi Matsukura; Yasuo Sato, all of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/744,965

(22) Filed: Nov. 7, 1996

(30) Foreign Application Priority Data

Nov. 22, 1995 (JP) ............................................. 7-304037

(51) Int. Cl.[7] .............................................. G06F 17/21
(52) U.S. Cl. ....................................... 707/530; 707/517
(58) Field of Search ................................. 707/515, 517, 707/518, 520, 530, 531, 539; 345/339, 342

(56) References Cited

U.S. PATENT DOCUMENTS

| | | | | |
|---|---|---|---|---|
| 5,001,697 A | * | 3/1991 | Torres | 345/439 |
| 5,347,625 A | * | 9/1994 | Kajimoto et al. | 707/539 |
| 5,467,448 A | * | 11/1995 | Hilton et al. | 707/520 |

(List continued on next page.)

FOREIGN PATENT DOCUMENTS

| | | |
|---|---|---|
| JP | 55-156982 | 12/1980 |
| JP | 63-075976 | 4/1988 |
| JP | 63-145570 | 6/1988 |
| JP | 63-191266 | 8/1988 |
| JP | 01-261720 | 10/1989 |
| JP | 02-118713 | 5/1990 |
| JP | 02-165380 | 6/1990 |
| JP | 02-250154 | 10/1990 |
| JP | 03-080296 | 4/1991 |
| JP | 03-175523 | 7/1991 |
| JP | 4-268954 | 9/1992 |
| JP | 5-108635 | 4/1993 |
| JP | 5-135034 | 6/1993 |
| JP | 05-258041 | 10/1993 |
| JP | 5-298311 | 11/1993 |
| JP | 06-004206 | 1/1994 |
| JP | 06-035651 | 2/1994 |
| JP | 06-208654 | 7/1994 |
| JP | 06-231116 | 8/1994 |
| JP | 6-236365 | 8/1994 |
| JP | 06-266706 | 9/1994 |
| JP | 7-210554 | 8/1995 |
| JP | 08-050530 | 2/1996 |

OTHER PUBLICATIONS

WordPerfect for Windows, version 5.1, WordPerfect Corporation, 1991, screen printouts 1–6.*
Cowart, Mastering Windows™ 3.1 Special Edition, SYBEX Corporation, 1993, pp. 5–17.*

Primary Examiner—Stephen S. Hong
(74) Attorney, Agent, or Firm—Staas & Halsey LLP

(57) ABSTRACT

A document processing apparatus displays a created document on a display screen and carries out an editing process with respect to the created document in response to an instruction from pointing device for pointing on the display screen. The document processing apparatus includes a detecting mechanism for detecting whether or not a document region change request which requests a change of a document region is issued, and a changing mechanism for changing a first document region on the display screen pointed by the pointing device to a prescribed region to which pointing of the pointing device changes when the detecting mechanism detects issuance of the document region change request.

8 Claims, 15 Drawing Sheets

U.S. PATENT DOCUMENTS

| | | | | |
|---|---|---|---|---|
| 5,630,040 A | * | 5/1997 | Furuya | 345/439 |
| 5,666,552 A | * | 9/1997 | Greyson et al. | 707/539 |
| 5,689,287 A | * | 11/1997 | Mackinlay et al. | 345/427 |
| 5,745,910 A | * | 4/1998 | Piersol et al. | 707/515 |
| 5,835,919 A | * | 11/1998 | Stern et al. | 707/515 |
| 5,920,327 A | * | 7/1999 | Seidensticker, Jr. | 345/523 |
| 6,085,202 A | * | 7/2000 | Rao et al. | 707/509 |

* cited by examiner

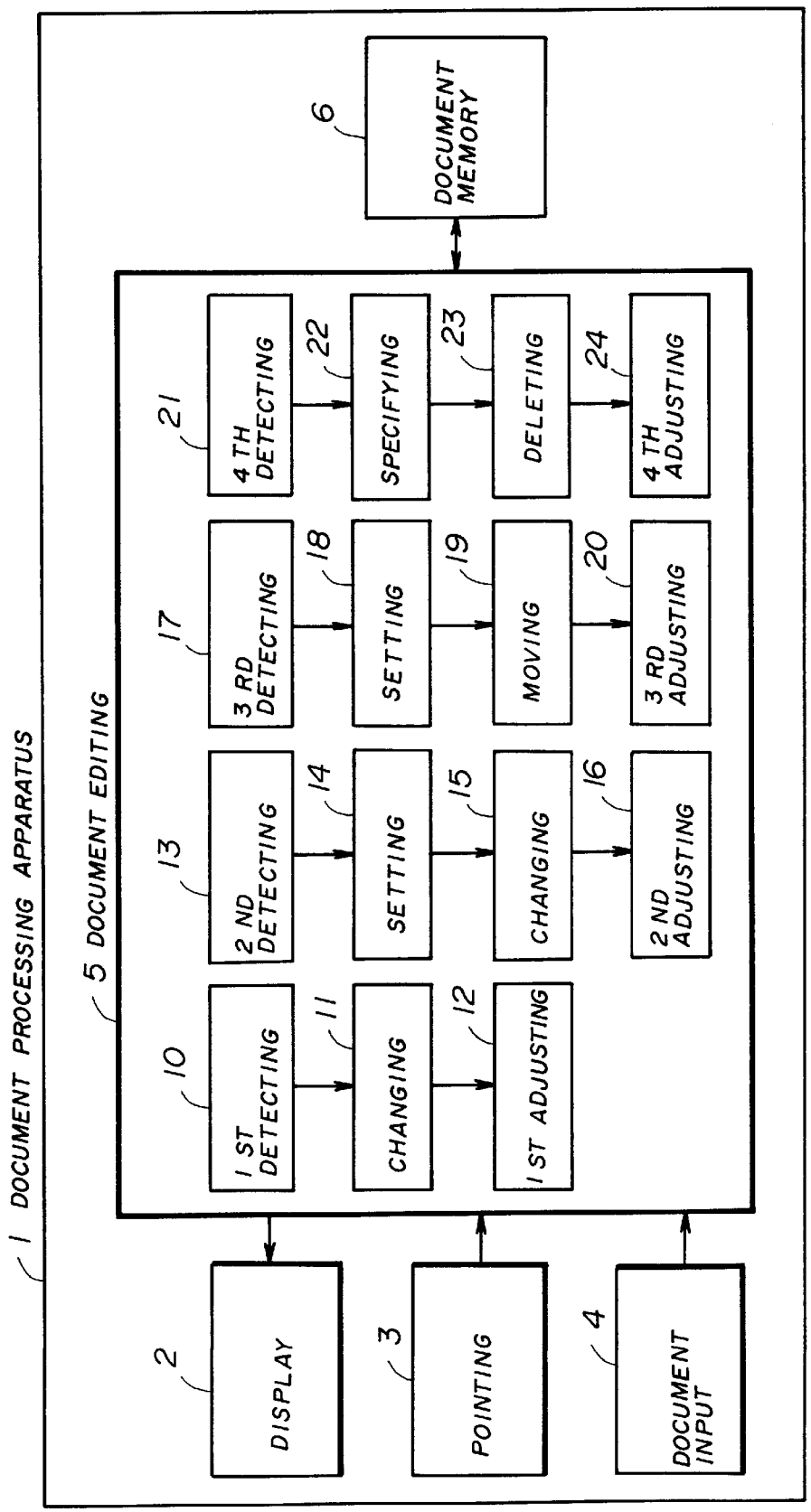

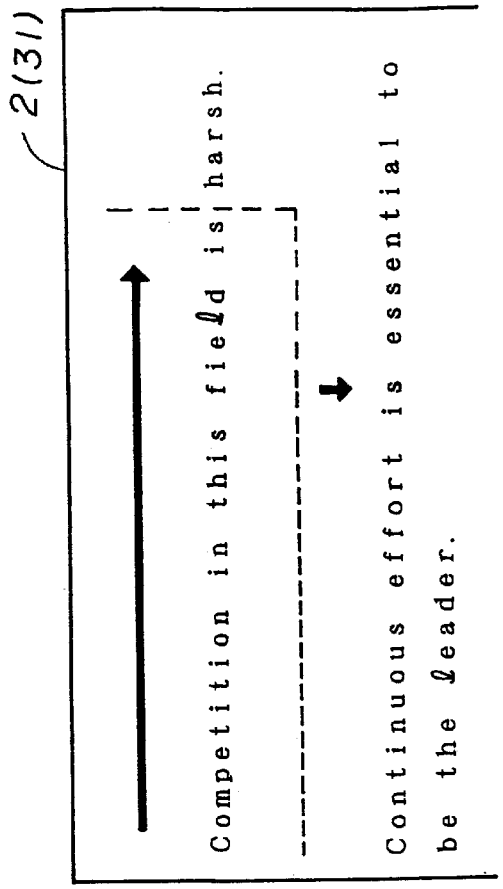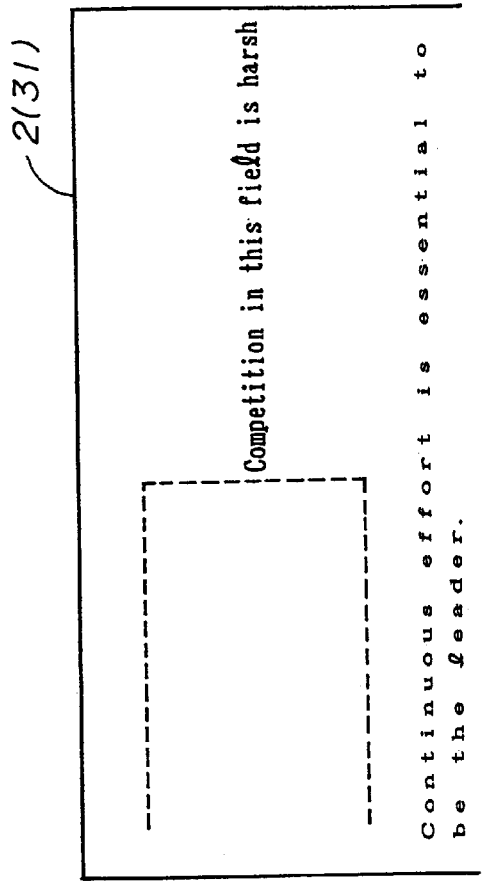
FIG.5A
FIG.5B

DOCUMENT PROCESSING APPARATUS AND COMPUTER PROGRAM PRODUCT THEREFOR

BACKGROUND OF THE INVENTION

The present invention generally relates to document processing apparatuses which edit created documents and to computer program products therefor, and more particularly to a document processing apparatus which enables addition of a document using a free format with respect to a created document and to a computer program product for such a document processing apparatus.

When creating a document in a document processing apparatus, a user may request addition of a document to the created document, and the document processing apparatus must be designed to cope with such a request. The document to be added may consist of one or more characters, symbols or spaces, one or more words, one or more sentences, graphics and the like.

Conventionally, the document processing apparatus is designed to prescribe a document region in advance. The document is created by developing an input document in the prescribed document region.

When the user makes a document adding request with respect to the created document, the user is urged to specify a document position in the document. Where the requested additional document is to be added and then to input the document which is requested to be added. The document addition is made by inserting the requested input document to the specified document position using the same character size as the created document, without changing the character size of the created document and the document region of the created document.

For example, let us suppose that a word "summer" is to be inserted between "long" and "vacation" with respect to a created document which reads "I am expecting to take a long vacation." In this particular case, a cursor is moved to the document position where the word "summer" is to be added as shown in FIG. 1A, and this document position is specified as shown in FIG. 1B by an insert instruction. Then, the word "summer" is input as shown in FIG. 1C using the same character size as the rest of the created document, without changing the character size of the created document and the document region of the created document, where the limits of the document region are indicated by the dotted lines in FIGS. 1A through 1D. After the word "summer" is input, an execute instruction is made, thereby resulting in an edited document which reads "I am expecting to take a long summer vacation." as shown in FIG. 1D.

However, according to the conventional document processing apparatus, the document is added with respect to the created document using a fixed format. For this reason, there was a problem in that the document cannot be added using a free format.

Particularly in portable document processing apparatus such as the so-called handy type electronic notebook, an input device is provided to input handwritten information. In such a portable document processing apparatus, the document is created based on the handwritten information input from the input device. But when using this input device, the user creates the document as if the user is writing on paper, and there was a problem in that it is sometimes impossible to create a document of a type desired by the user if the addition of the document is made using the fixed format of the conventional document processing apparatus described above.

Furthermore, when a correction is made with respect to the created document in the conventional document processing apparatus, there was a problem in that it is impossible to distinguish the corrected portion of the created document.

SUMMARY OF THE INVENTION

Accordingly, it is a general object of the present invention to provide a novel and useful document processing apparatus and a computer program product therefor, in which the problems described above are eliminated.

Another and more specific object of the present invention is to provide a document processing apparatus and a computer program product therefor, which enable addition of a document element with respect to a created document using a free format.

In this specification, a "document element" refers to data including at least one of a character, symbol, space, word, sentence, graphics and the like.

Still another object of the present invention is to provide a document processing apparatus which displays a created document on a display screen and carries out an editing process with respect to the created document in response to an instruction from pointing means for pointing on the display screen detecting means for detecting whether a document region change request which requests a change of a document region is issued, and changing means, responsive to the detecting means, for changing a first document region on the display screen defined by the pointing means to a prescribed region defined by the pointing means changes when the detecting means detects issuance of the document region change request. According to the document processing apparatus of the present invention, it is possible to freely enlarge a document region of a document after inputting the document, for example, so that a document element can be added in the enlarged region. As a result, it is possible to add the document element using a free format so as to create a document of the type desired by the user. It is also possible to indicate a corrected portion when the created document is corrected.

A further object of the present invention is to provide a document processing apparatus which displays a created document on a display screen and carries out an editing process with respect to the created document in response to an instruction from pointing means for pointing on the display screen. Detecting means for detecting whether a document region acquisition request which requests acquisition of a document region is and, setting means, responsive to the detecting means, for setting a first document region in a region defined by the pointing means when the detection means detects issuance of the document region acquisition request, changing means, responsive to the setting means, changes the first document region set by the setting means to a prescribed region to which pointing of the pointing means changes, and adjusting means, responsive to the changing means, for adjusting one a data size a data interval of a document element in a second document region, which is subject to change due to a change in the first document region made by the means, corresponding to the change in the first document region. According to the document processing apparatus of the present invention, it is possible to freely enlarged a region between specific characters of a document after inputting the document, for example, so that a document element can be added in the enlarged region. As a result, it is possible to add the document element using a free format so as to create a document of the type desired by the user. It is also possible to indicate a corrected portion when the document is corrected.

Another object of the present invention is to provide a document processing apparatus which displays a created document on a display screen and carries out an editing process with respect to the created document in response to an instruction from pointing means for pointing on the display screen. Detecting means for detecting whether a document region exclusive acquisition request which requests exclusive acquisition of a document region is issued, and setting means, responsive to the detecting means, for setting a first document region having no document element in a region defined by the pointing means when the detection means detects issuance of the document region exclusive acquisition moving means, responsive to the setting means, moves a first document element excluded by the first document region set by the setting means to a second document region at a document linking destination while adjusting one of a data size a data interval of the first document. Adjusting means, responsive to the moving means, adjusts one a data size a data interval of a second document in a third document region, which is subject to change due to the first document region set by the setting means corresponding to the change in the first document region. According to the document processing apparatus of the present invention, it is possible to freely acquire a document region having no document element input therein inside a document after inputting the document, for example, so that a document element can be added in the acquired region. As a result, it is possible to add the document element using a free format so as to create a document of the type desired by the user. It is also possible to indicate a corrected portion when the document is corrected.

Still another object of the present invention is to provide a document processing apparatus which displays a created document on a display screen and carries out an editing process with respect to the created document in response to an instruction from pointing means for pointing on the display screen detecting means for detecting whether a documented element delete request which requests deletion of a element is issued, and specifying means, responsive to the detecting means, for specifying a region defined by the pointing means when the detecting means detects issuance of the document element delete request. Deleting means, responsive to the specifying means, deletes a first document element in the region specified by the specifying means, and adjusting means, responsive to the deleting means, adjusts one of a data size and a data interval of a second element in a document region including the region which is specified by the specifying means corresponding to the first document element deleted by the deleting means. According to the document processing apparatus of the present invention, it is possible to freely delete a portion of a document after inputting the document, for example, so that a region to which data can be input is acquired between the documents elements which are not deleted and a document element can be added in the acquired region. As a result, it is possible to add the document element using a free format so as to create a document of the type desired by the user. It is also possible to indicate a corrected portion when the document is corrected.

A further object of the present invention is to provide a computer program product having a computer readable medium having computer program logic recorded thereon for performing document processing which displays a created document on a display screen and carries out an editing process with respect to the created document in response to an instruction from pointing means for pointing on the display screen. Detecting means for detecting whether a document region change request which requests a change of a document region is issued, and changing means, responsive to the detecting means, for changing a first document region on the display screen defined by the pointing means to a prescribed region defined by the pointing means when the detecting means detects issuance of the document region change request. According to the computer program product of the present invention, it is possible to freely enlarge a document region of a document after inputting the document, for example, so that a document element can be added in the enlarged region. As a result, it is possible to add the document element using a free format so as to create a document of the type desired by the user. It is also possible to indicate a corrected portion when the document is corrected.

Another object of the present invention is to provide a computer program product having a computer readable medium having computer program logic recorded thereon for performing document processing which displays a created document on a display screen and carries out an editing process with respect to the created document in response to an instruction from pointing means for pointing on the display screen. Detecting means for detecting whether a document region acquisition request which requests acquisition of a document region is issued, and setting means, responsive to the detecting means, for setting a first document region in a region defined by the pointing means when the detection means detects issuance of the document region acquisition request. Changing means, responsive to the setting means, changes the first document region set by the setting means to a prescribed region to defined by the pointing means, and adjusting means, responsive to the changing means, for adjust one of a data size and a data interval of a document element in a second document region, which is subject to change due to a change in the first document region made by the changing means, corresponding to the change in the first document region. According to the computer program product of the present invention, it is possible to freely enlarge a region between specific characters of a document after inputting the document, for example, so that a document element can be added in the enlarged region. As a result, it is possible to add the document element using a free format so as to create a document of the type desired by the user. It is also possible to indicate a corrected portion when the document is corrected.

Still another object of the present invention is to provide a computer program product having a computer readable medium having computer program logic recorded thereon for performing document processing which displays a created document on a display screen and carries out an editing process with respect to the created document in response to an instruction from pointing means for pointing on the display screen. Detecting means for detecting whether a document region exclusive acquisition request which requests exclusive acquisition of a document region is issued, and setting means, responsive to the detecting means, for setting a first document region having no document element in a region defined by the pointing means when the detection means detects issuance of the document region exclusive acquisition request. Moving means, responsive to the setting means, moves a first document which is excluded by the first document region set by the setting means to a second document region at a document linking destination while adjusting one of a data size and a data interval of the first document, and adjusting means, responsive to the moving means, a adjusts one of a data size and a data interval of a second document in a third document region, which is subject to change due to the first document region set by the setting means, corresponding to on the change in the first document region. According to the computer program product of the present invention, it is possible to freely acquire a document region having no document element input therein inside a document after inputting the document, for example, so that a document element can be added in the acquired region. As a result, it is possible to add the document element using a free format so as to create a document of the type desired by the user. It is also possible to indicate a corrected portion when the document is corrected.

A further object of the present invention is to provide a computer program product having a computer readable medium having computer program logic recorded thereon for performing document processing which displays a created document on a display screen and carries out an editing process with respect to the created document in response to an instruction from pointing means for pointing on the display screen. Detecting means for detecting whether a document element delete request which requests deletion of a document element is issued, and specifying means, responsive to the detecting means, for specifying a region defined by the pointing means when the detecting means detects issuance of the document delete request. Deleting, means, responsive to the specifying means, for deleting a first document element in the region which is specified by the specifying means, and adjusting means, responsive to the deleting means, for adjusts one of a data size and a data interval of a second document element in a document region, including the region specified by the specifying means, corresponding to the first document element deleted by the deleting means. According to the computer program product of the present invention, it is possible to freely delete a portion of a document after inputting the document, for example, so that a region to which data can be input is acquired between the document elements which are not deleted and a document element can be added in the acquired region. As a result, it is possible to add the document element using a free format so as to create a document of the type desired by the user. It is also possible to indicate a corrected portion when the document is corrected.

Other objects and further features of the present invention will be apparent from the following detailed description when read in conjunction with the accompanying drawings.

BRIEF DESCRIPTION OF THE DRAWINGS

FIG. 2 is a system block diagram for explaining the operating principle of the present invention;

FIGS. 5A and 5B respectively are diagrams for explaining a further process of the present invention;

DESCRIPTION OF THE PREFERRED EMBODIMENTS

Figure 1A:
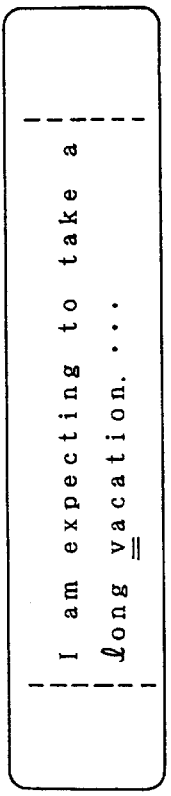
FIGS. 1A through 1D respectively are diagrams for explaining the operation of a conventional document processing apparatus.
Figure 1B:
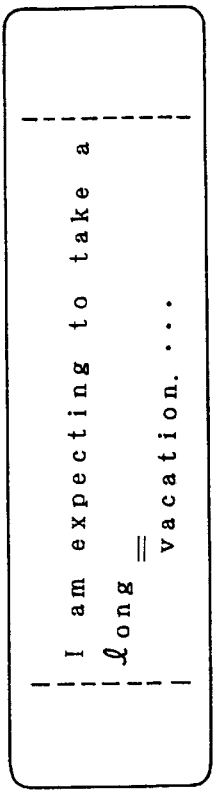
Figure 1C:
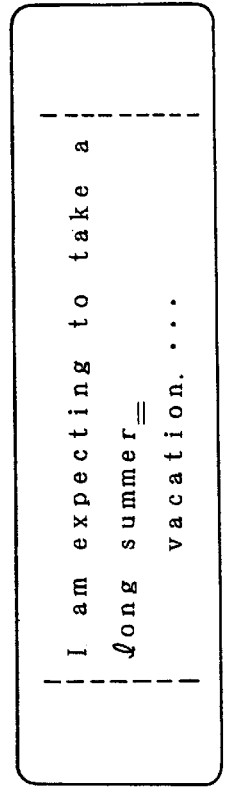
Figure 1D:
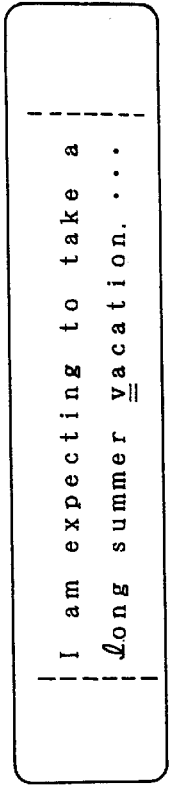

First, a description will be given of the operating principle of the present invention, by referring to FIGS. 2 through 6.

FIG. 2 is a system block diagram for explaining an operating principle of the present invention. A document processing apparatus 1 shown in FIG. 2 includes a display means 2 for displaying a display screen, a pointing means 3 for pointing on the display screen, a document input means 4 for inputting a document, a document editing means 5 for carrying out an editing process with respect to a created document, and a document memory means 6 in which the created document is developed. The created document is displayed on the display screen, and the editing process with respect to the created document is carried out according to instructions made by the pointing means 3.

In this specification, a "document element" refers to data including at least one of a character, symbol, space, word, sentence, graphics and the like.

The document editing means 5 includes a first detecting means 10, a changing means 11, a first adjusting means 12, a second detecting means 13, a setting means 14, a changing means 15, a second adjusting means 16, a third detecting means 17, a setting means 18, a moving means 19, a third adjusting means 20, a fourth detecting means 21, a specifying means 22, a deleting means 23, and a fourth adjusting means 24.

The first detecting means 10 detects whether or not a document region change request which requests change of a document region has been issued. The changing means 11 changes a document region previously defined by the pointing means 3 to a new prescribed region defined by the pointing means 3, when the first detecting means 10 detects the issuance of the document region change request. The first adjusting means 12 adjusts data interval or a data size of document element in the document region which is subject to change due to the changing of the document region by the changing means 11, so as to match that of the change.

The second detecting means 13 detects whether or not a document region acquisition request which requests acquisition of a document region has been issued. The setting means 14 sets a document region in a region which is defined, that is, marked, by the pointing means 3 when the second detecting means 13 detects the issuance of the document region acquisition request. The changing means 15 changes the document region which is set by the setting means 14 to a new prescribed region defined by the pointing means 3. The second adjusting means 16 adjusts the data interval or the data size of document element in the document region which is subject to change due to the changing of the document region by the changing means 15, so as to match that of the change.

The third detecting means 17 detects whether or not a document region exclusive acquisition request which requests exclusive acquisition of a document region has been issued. The setting means 18 sets a document region which has no document element in a region which is defined by the pointing means 3 when the third detecting means 17 detects the issuance of the document region exclusive acquisition request. The moving means 19 moves the document which is excluded by the document region set by the setting means to a document region at a document linking destination, while adjusting the data size or the data interval. The third adjusting means 20 adjusts the data interval or the data size of document element in the document region which is subject to change due to the document region which is set by the setting means 18, so as to match that of the change.

The fourth detecting means 21 detects whether or not a document element delete request which requests deletion of a document has been issued. The specifying means 22 specifies a region defined by the pointing means 3 when the fourth detecting means 21 detects the issuance of the document element delete request. The deleting means 23 deletes the document element in the region which is specified by the specifying means 22. The fourth adjusting means 24 adjusts the data interval or the data size of document element in the document region which includes the region specified by the specifying means 22, depending on the amount of document elements deleted by the deleting means 23.

Hence, according to the document processing apparatus 1, when the first detecting means 10 detects the issuance of the document region change request, the changing means 11 changes the document region which is defined by the pointing means 3 to a new prescribed region to defined by the pointing means 3. In this state, when the document region which is subject to change due to the changing of the document region by the changing means 11 has a document element, the first adjusting means 12 adjusts the data size or the data interval of the document element in the document region which is subject to the change so as to match that of the change.

Figure 3A:
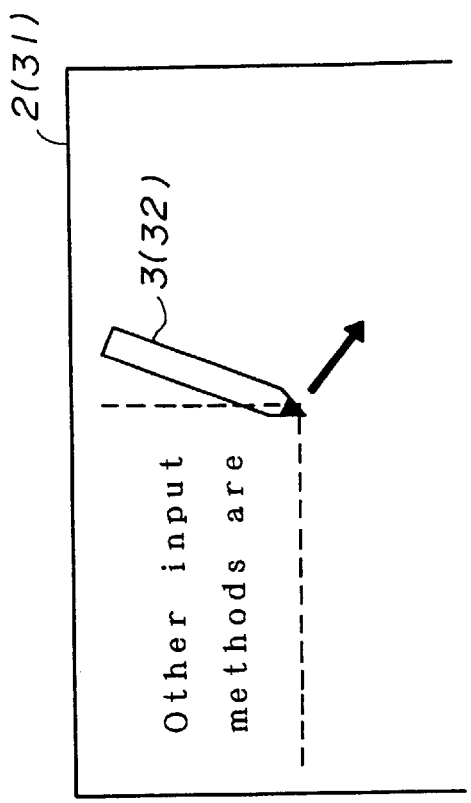
FIGS. 3A and 3B respectively are diagrams for explaining a process of the present invention.
Figure 3B:
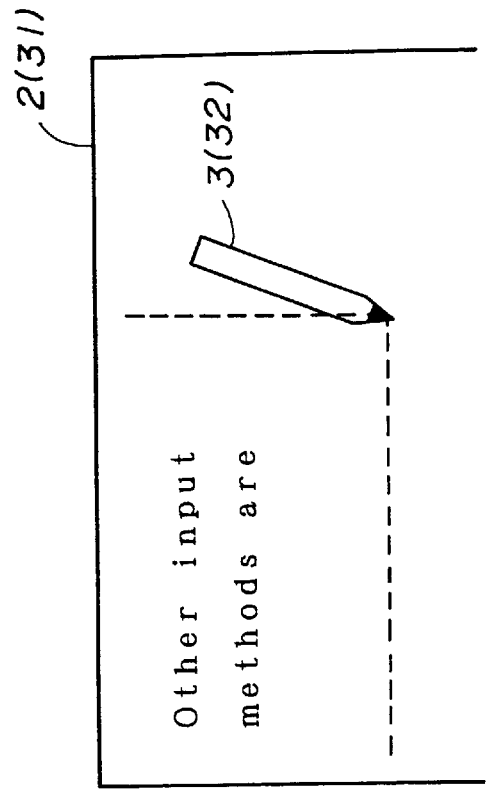

As a result, when the pointing means 3 is moved in the direction of an arrow in FIG. 3A, for example, the document region defined by the pointing means 3 expands as if the document region were elastic, as shown in FIG. 3B, so that a document element can be added within the expanded document region.

In addition, according to the document processing apparatus 1, when the second detecting means 13 detects the issuance of the document region acquisition request, the setting means 14 sets the document region in the region defined by the pointing means 3. Further, the changing means 15 changes the document region which is set by the setting means 14 to the new prescribed region defined by the pointing means 3. Moreover, the second adjusting means 16 adjusts the data size or the data interval of document element in the document region which is subject to change due to the changing of the document region by the changing means 15, so as to match that of the change.

Figure 4A:
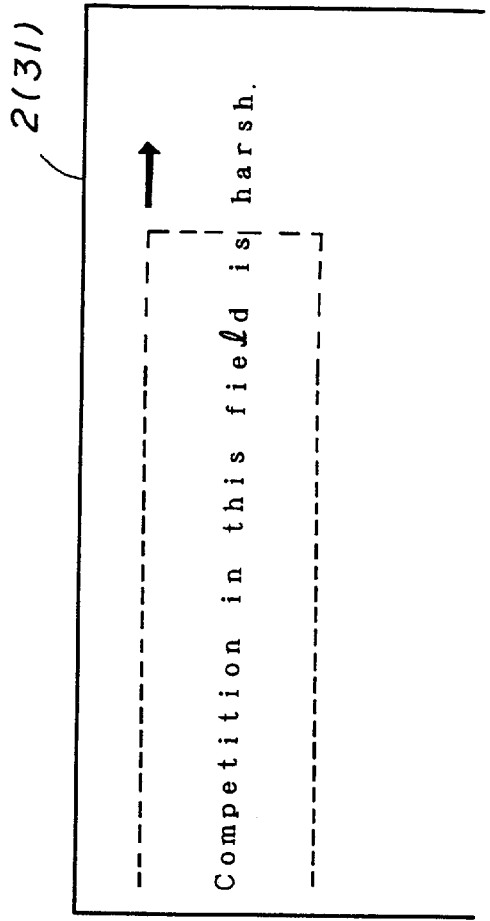
FIGS. 4A and 4B respectively are diagrams for explaining another process of the present invention.
Figure 4B:
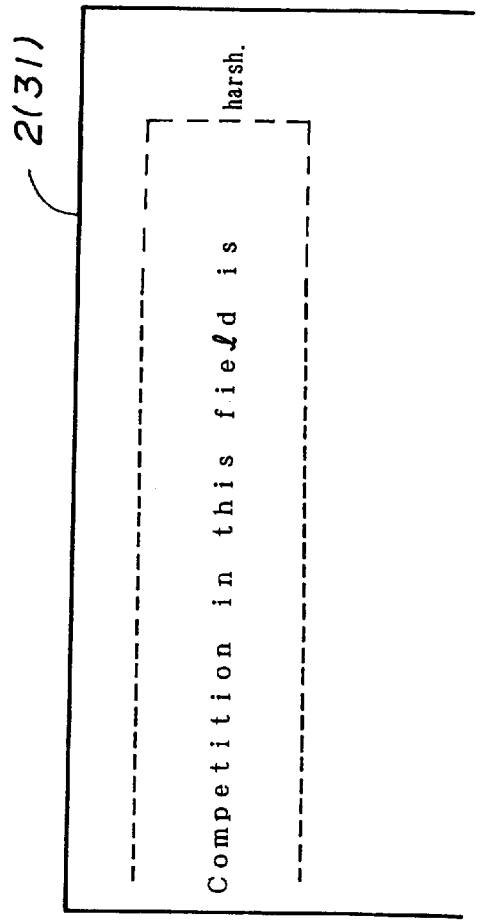

Therefore, when the document region which is set by the defining process of the pointing means 3 is expanded in the direction of an arrow in FIG. 4A, for example, as if the document region were elastic, while reducing document element in another document region, the expanded document region becomes as shown in FIG. 4B so that document elements can be added therein.

Also, according to the document processing apparatus 1, when the third detecting means 17 detects the issuance of the document region exclusive acquisition request, the setting means 18 sets the document region having no document elements in the region which is defined by the pointing means 3. In addition, the moving means 19 moves document elements excluded by the document region set by the setting means 18 to the document region at the document linking destination, while adjusting the data size or the data interval of the excluded document elements. The third adjusting means 20 adjusts the data interval or the data size of document elements in the document region which is subject to change due to the document region set by the setting means 18, so as to match that of the change.

When the document region which is set by the defining process of the pointing means 3 spreads in the direction of an arrow in FIG. 5A, for example, while excluding and reducing the document in another document region as if the document region were a drop of oil which spreads on a water surface, the spread document region becomes as shown in FIG. 5B so that the document can be added in this newly acquired document region.

Furthermore, according to the document processing apparatus 1, when the fourth detecting means 21 detects the issuance of the document element delete request, the specifying means 22 specifies the region defined by the pointing means 3, and the deleting means 23 deletes the document element in the region that is specified by the specifying means 22. In addition, the fourth adjusting means 24 adjusts the data interval or the data size of the document element in the document region which includes the region specified by the specifying means 22 depending on the amount of document element deleted by the deleting means 23.

Figure 6A:
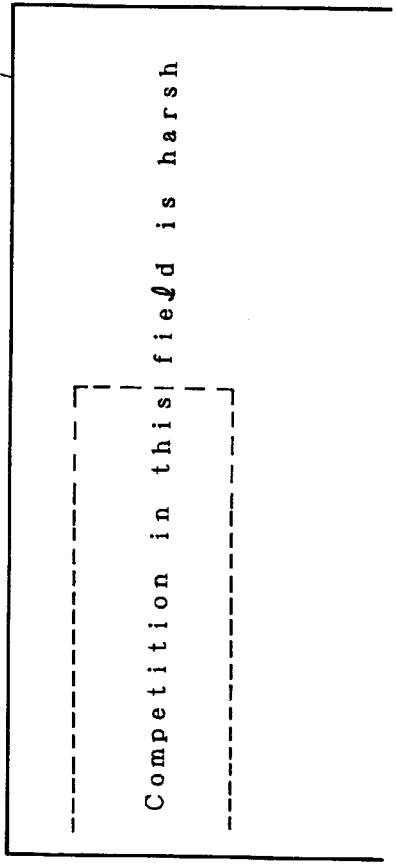
FIGS. 6A and 6B respectively are diagrams for explaining still another process of the present invention.
Figure 6B:
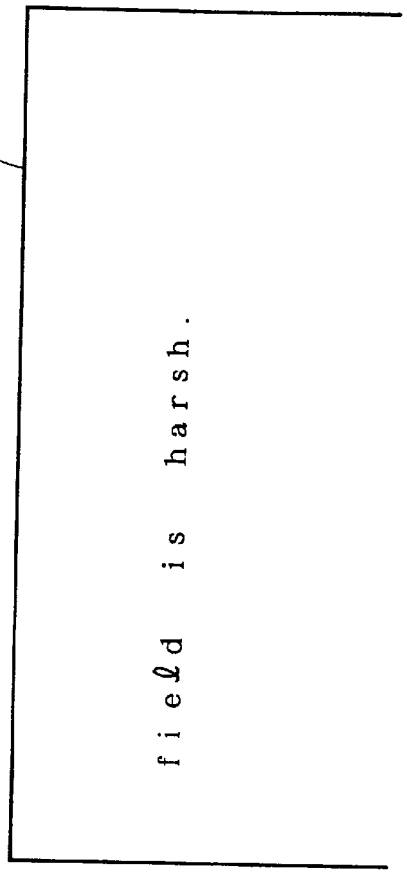

Accordingly, the document element in the region which is specified by the defining process of the pointing means 3 as shown in FIG. 6A is deleted, and the remaining document element in the document region which includes this specified region is expanded as if it were elastic as shown in FIG. 6B. Hence, the user can freely add document elements in the expanded document region.

Therefore, document elements can be added with respect to the created document using a free format in the document processing apparatus 1, thereby making it possible to create a document of the type desired by the user. In addition, when the created document is corrected, it is possible to indicate the corrected portions of the created document.

Figure 7:
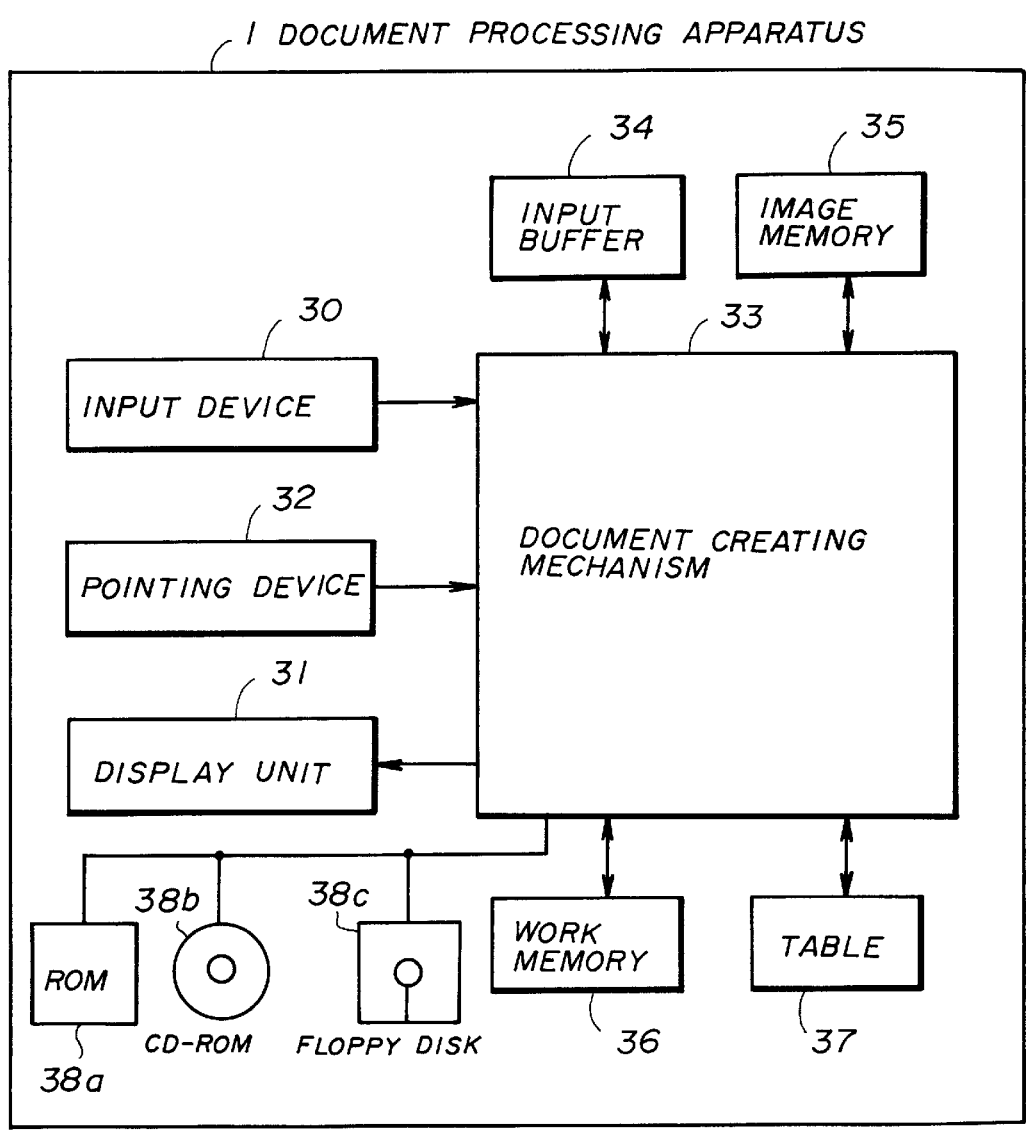
FIG. 7 is a system block diagram showing an embodiment of a document processing apparatus according to the present invention.

Next, a description will be given of an embodiment of the document processing apparatus according to the present invention, by referring to FIGS. 7 through 15. FIG. 7 is a system block diagram showing the embodiment of the document processing apparatus.

As shown in FIG. 7, the document processing apparatus 1 includes a handwritten data input device 30, a display unit 31, a pointing device 32, a document creating mechanism 33, an input buffer 34, an image memory 35, a work memory 36, a region management table 37, and at least one of storage media 38a through 38c.

In this embodiment, the storage media 38a, 38b and 38c respectively are a ROM, a CD-ROM and a floppy disk, but the type of storage medium is of course not limited to such. The document creating mechanism 33 includes an internal memory and a central processing unit (CPU) which carries out various functions based on programs which are read from at least one of the storage media 38a through 38c and stored in the internal memory.

The present invention includes a computer program product which is a storage medium including instructions which can be used to program a computer to perform a process of the invention, that is, the process of the document processing apparatus 1. The storage medium can include, but is not limited to, any type of disk including hard disks, floppy disks, optical disks, CD-ROMs, and magneto-optical disks, ROMs, RAMs, EPROMs, EEPROMS, SRAMs, flash memories, magnetic or optical cards, or any type of media suitable for storing electronic instructions.

The handwritten data input device 30 generates handwritten characters, symbols and graphics (hereinafter simply referred to as handwritten document data) depending on an input unit, and issues a document create command, a document edit command or the like. The display unit 31 displays the created document on a display screen. The pointing device 32 sets a document region by pointing on the display screen. In this embodiment, the pointing device 32 is a so-called mouse.

Of course, it is possible to use a known handwritten document data input device for the handwritten document data input device 30, a known pointing device for the pointing device 32, and a known display unit for the display unit 31.

The document creating mechanism 33 creates a document based on the handwritten data generated by the handwritten document data input device 30. The input buffer 34 temporarily stores the input unit of the handwritten data generated by the handwritten data input device 30. The image memory 35 stores document data of the created document. The work memory 36 is used as a work region of the document create process, and stores the document data displayed on the display screen. The region management table 37 manages various kinds of information of the document region.

Figure 8:
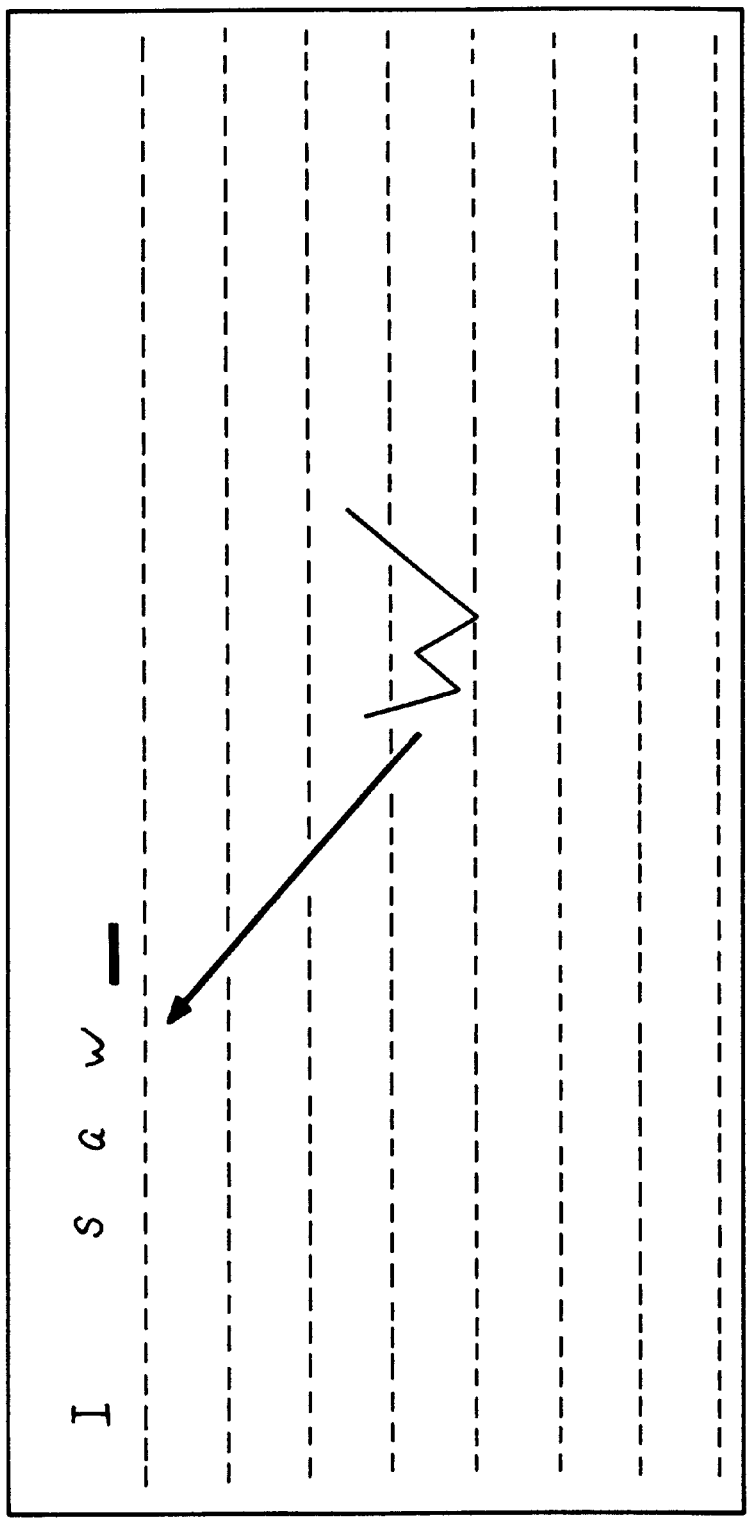
FIG. 8 is a diagram for explaining a document create process.

The document creating apparatus 33 temporarily stores the input unit of the handwritten document data generated by the handwritten document data input device 30 into the input buffer 34, and creates the document as shown in FIG. 8 by normalizing the input unit to a prescribed character size and storing the character into the work memory 36.

Figure 9:
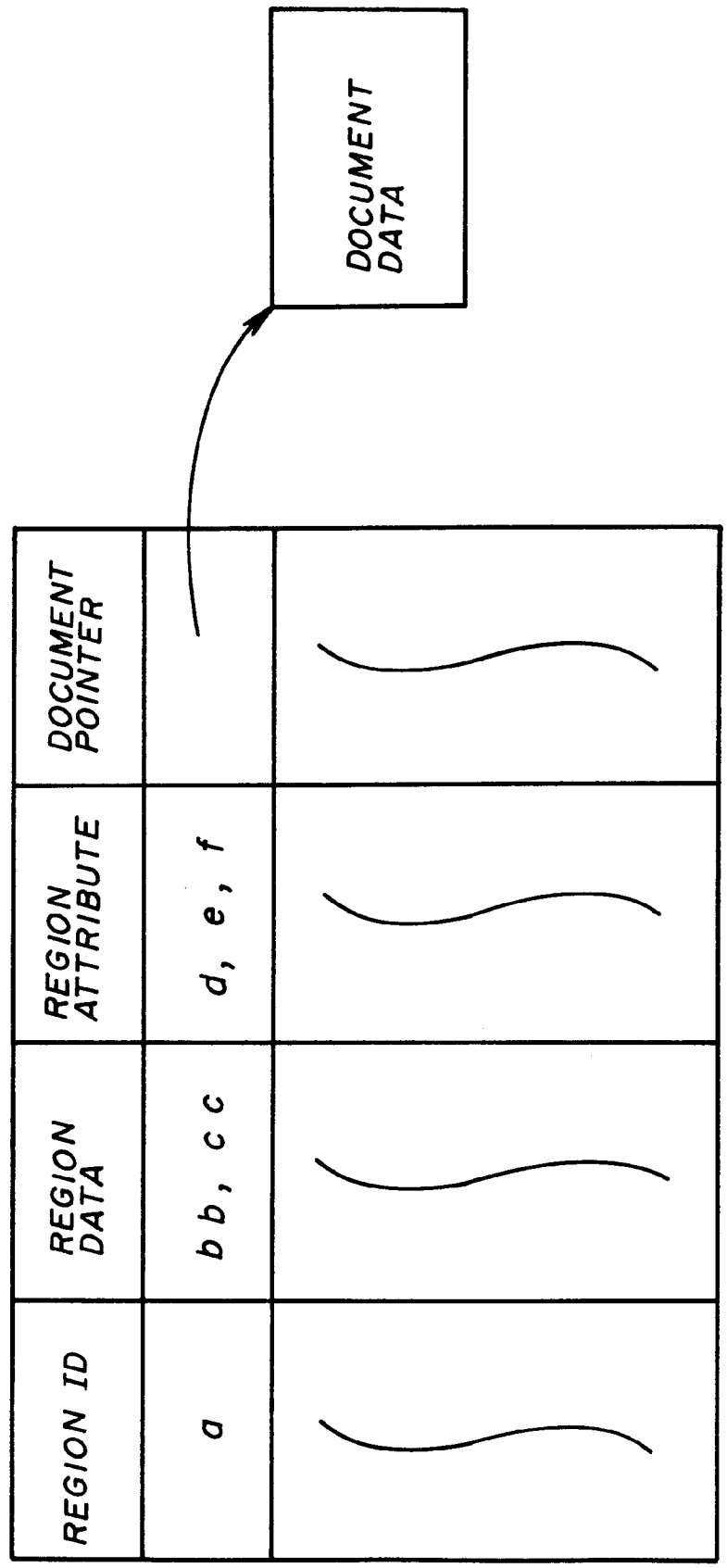
FIG. 9 is a diagram for explaining a region management table.

The region management table 37 manages a region identification (ID) of the document which is set by the pointing device 32, region data including a starting position and size of the document region, region attributes including character size of the document region, a document pointer which points to the document data input to the document region and the like, as shown in FIG. 9.

Next, a more detailed description will be given of the operation of the document creating mechanism 33, by referring to FIG. 10.

Figure 10:
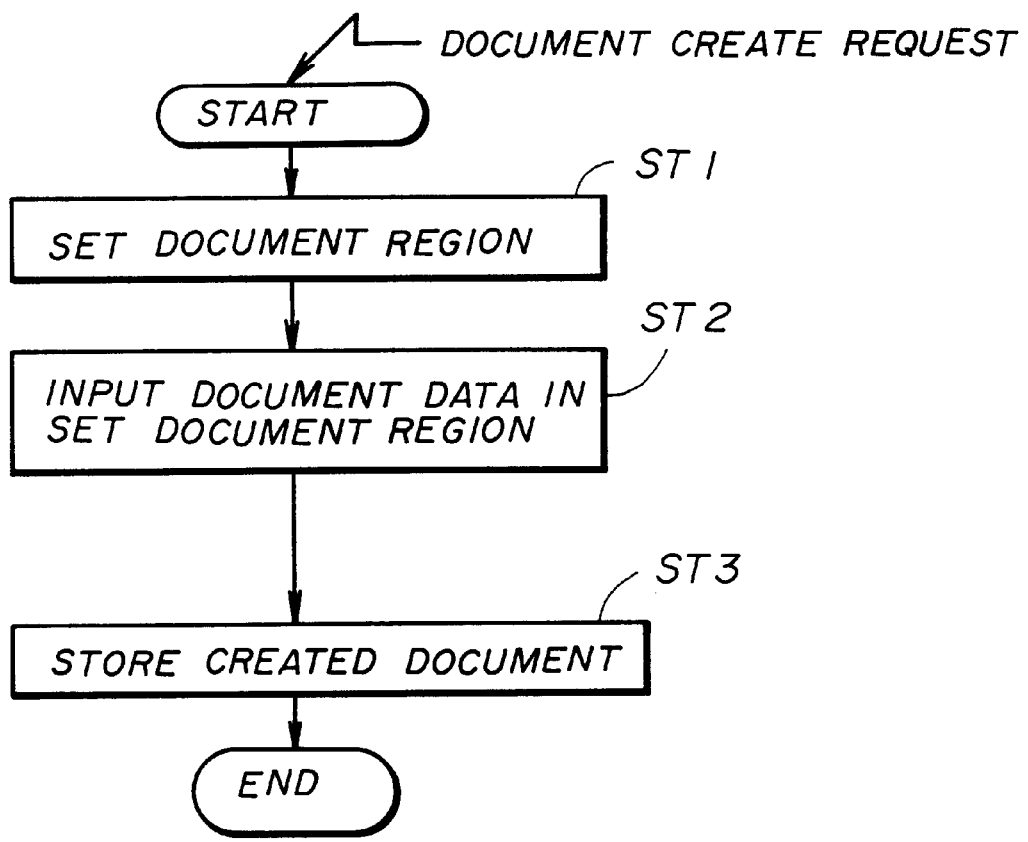
FIG. 10 is a flow chart for explaining the operation of a document creating mechanism responsive to a document create request.

FIG. 10 is a flow chart for explaining the operation of the document creating mechanism 33. In FIG. 10, when a document create request is issued by the user, a step ST1 sets the document region by detecting the position which is designated by the pointing device 32 on the display screen. In addition, the document creating mechanism 33 sets the region attribute of the document region through interactive processes or the like with the user, and registers the region attribute and the like in the region management table 37. For example, a document region DR is set at a position indicated by the dotted lines in a display screen DS shown FIG. 11, and the region attributes such as the character size input to this document region DR are set and registered in the region management table 37.

Figure 11:
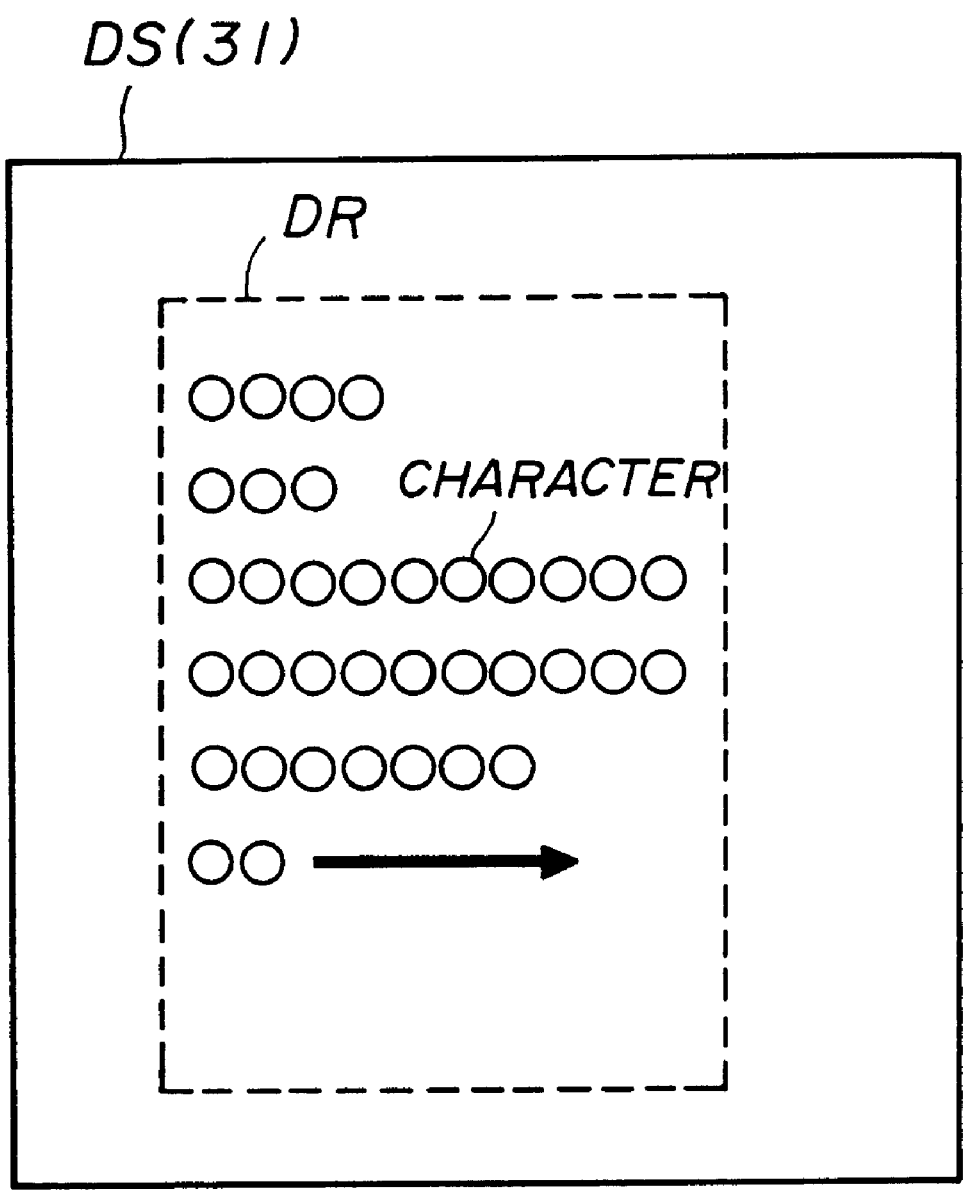
FIG. 11 is a diagram for explaining a document create process.

Then, a step ST2 receives the handwritten document data generated by the handwritten document data input device 30, normalizes the handwritten document data to the set character size, and develops the normalized data in a memory region of the work memory 36 pointed by a cursor position within the set document region, to thereby create the document and to display the created document on the display screen DS. The pointer to the input document data is also registered in the region management table 37. In other words, the handwritten document data generated by the handwritten document data input device 30 are received, and the document is created as shown in FIG. 11 by normalizing the handwritten document data into the set character size while inputting the normalized data in the set document region.

When this document create process ends, a step ST3 stores the document data developed in the work memory 36 and the data registered in the region management table 37 into the image memory 35. As a result, the created document is stored and the process ends.

Figure 12:
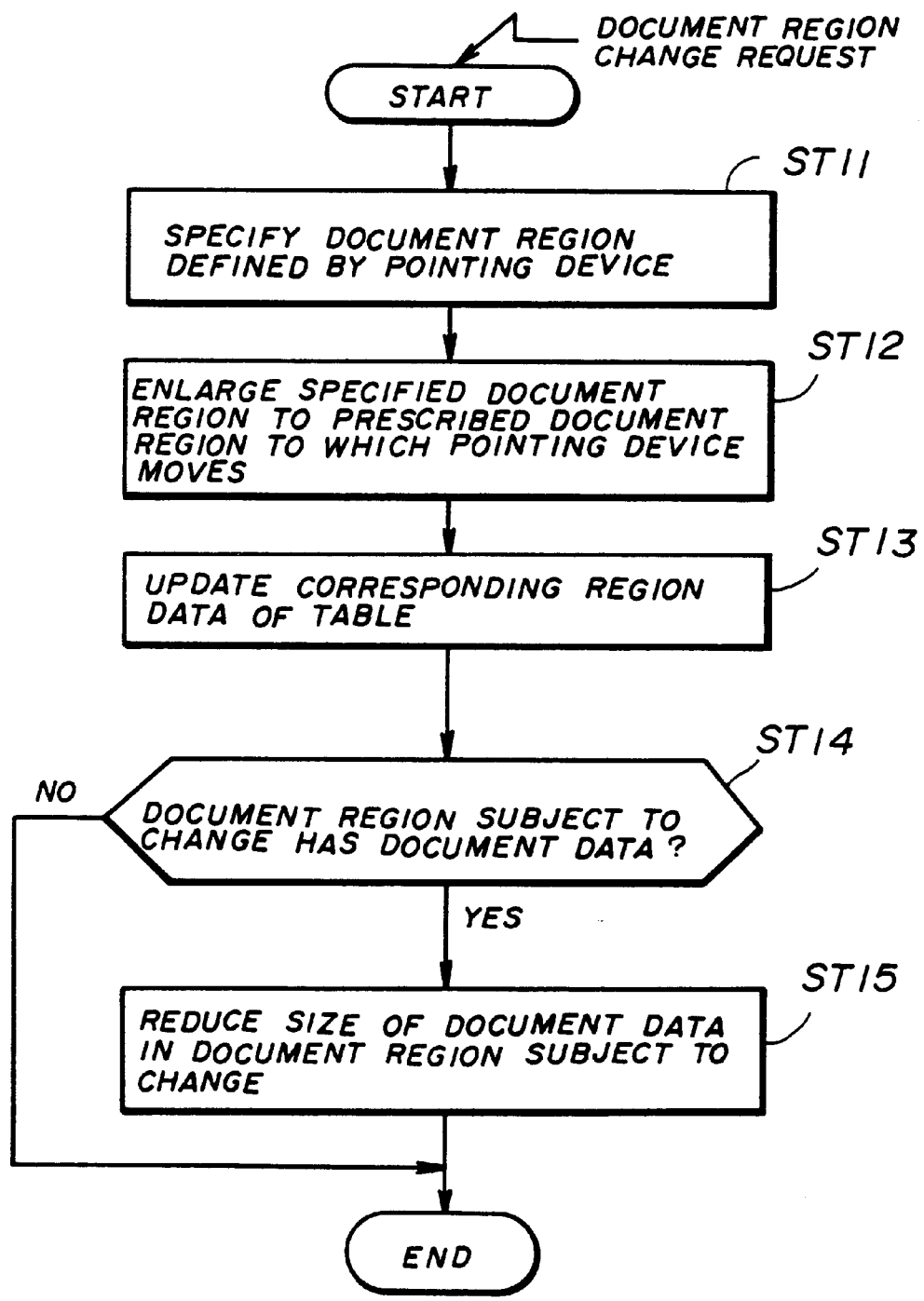
FIG. 12 is a flow chart for explaining the operation of the document creating mechanism responsive to a document region change request.

Next, a description will be given of the operation of the document creating mechanism 33 when the user issues a document region change request when the document create process is being carried out, by referring to FIG. 12. FIG. 12 is a flow chart for explaining the operation of the document creating mechanism 33 responsive to the document region change request.

In FIG. 12, when the document region change request is issued by the user when the document create process is being carried out by the document creating mechanism 33, a step ST11 specifies the document region that is requested to be changed by specifying the document region which is defined by the pointing device 32. This specifying process is carried out by retrieving the data defined by the pointing device 32 out of the region data registered in the region management table 37. Hence, by this specifying process, the document region which is requested to be changed and is indicated by the dotted lines in FIG. 3A, for example, is specified.

A step ST12 enlarges the document region which is specified in the step ST11 to the newly prescribed document region defined by the pointing device 32. For example, as shown in FIG. 3B, the document region which is specified in the step ST11 is enlarged in response to the new destination defined by the pointing device 32.

A step ST13 updates the region data of the document region which is specified in the step ST11 and are to be registered in the region management table 37 to those of the document region changed, that is, enlarged, in the step ST12. In addition, a document region which is subject to change, that is, reduction, due to the document region which is enlarged in the step ST12 is specified, and the region data of this specified document region to be registered in the region management table 37 are also updated depending on the change.

A step ST14 makes a reference to the region management table 37 and decides whether or not the document region which is subject to the change has document data, and the process ends if the decision result in the step ST14 is NO. On the other hand, if the decision result in the step ST14 is YES, a step ST15 reduces the document data depending on the change in the document region, and the process ends.

Accordingly, by carrying out the operation shown in FIG. 12, the user can freely enlarge the document region of a document after inputting the document, as shown in FIGS. 3A and 3B, so that document data can be added in the enlarged document region.

Figure 13:
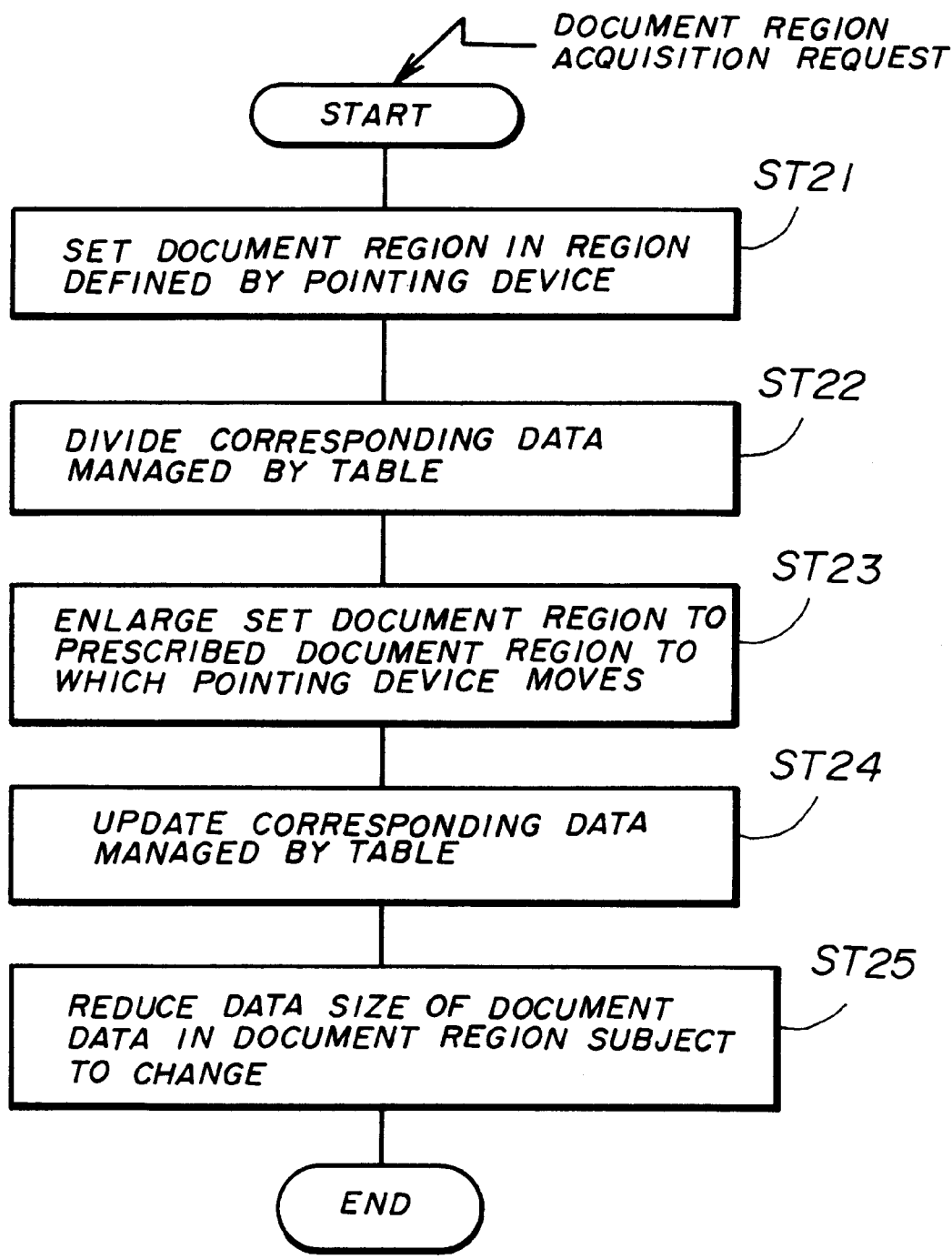
FIG. 13 is a flow chart for explaining the operation of the document creating mechanism responsive to a document region acquisition request.

Next, a description will be given of the operation of the document creating mechanism 33 when the user issues a document region acquisition request when the document create process is being carried out, by referring to FIG. 13. FIG. 13 is a flow chart for explaining the operation of the document creating mechanism 33 responsive to the document region acquisition request.

In FIG. 13, when the document region acquisition request is issued by the user when the document create process is being carried out by the document creating mechanism 33, a step ST21 sets a new document region from the created document in a region which is defined by the pointing device 32. For example, the step ST21 sets the document region indicated by the dotted lines in FIG. 4A.

A step ST22 specifies the document region which includes the document region set in the step ST21. In addition, the management data of the specified document region to be registered in the region management table 37 are divided into two, and new region data are registered in each of the two divisions. By registering the pointer to the document data for each of the two divisions, the document region set in the step ST21 is registered in the region management table 37.

Then, a step ST23 enlarges the document region set in the step ST21 to the prescribed document region to which the pointing of the pointing device 32 changes. For example, the document region set in the step ST21 is enlarged as shown in FIG. 4B depending on the new destination to which the pointing of the pointing device 32 moves.

A step ST24 updates the region data of the document region set in the step ST21 and to be registered in the region management table 37 to those of the document region enlarged in the step ST23. In addition, the document region which is subject to change, that is, reduction, due to the enlargement of the document region in the step ST23 is specified, and the region data of this specified document region to be registered in the region management table 37 are updated depending on the change.

Further, a step ST25 makes a reference to the region management table 37 and specifies the document data of the document region which is subject to the change, that is, reduction. The specified document data are reduced depending on the change of the document region, and the process ends.

Therefore, by carrying out the operation shown in FIG. 13, the user can freely enlarge inbetween specific characters of the document region of a document after inputting the document, as shown in FIGS. 4A and 4B, so that document data can be added in the enlarged document region.

Figure 14:
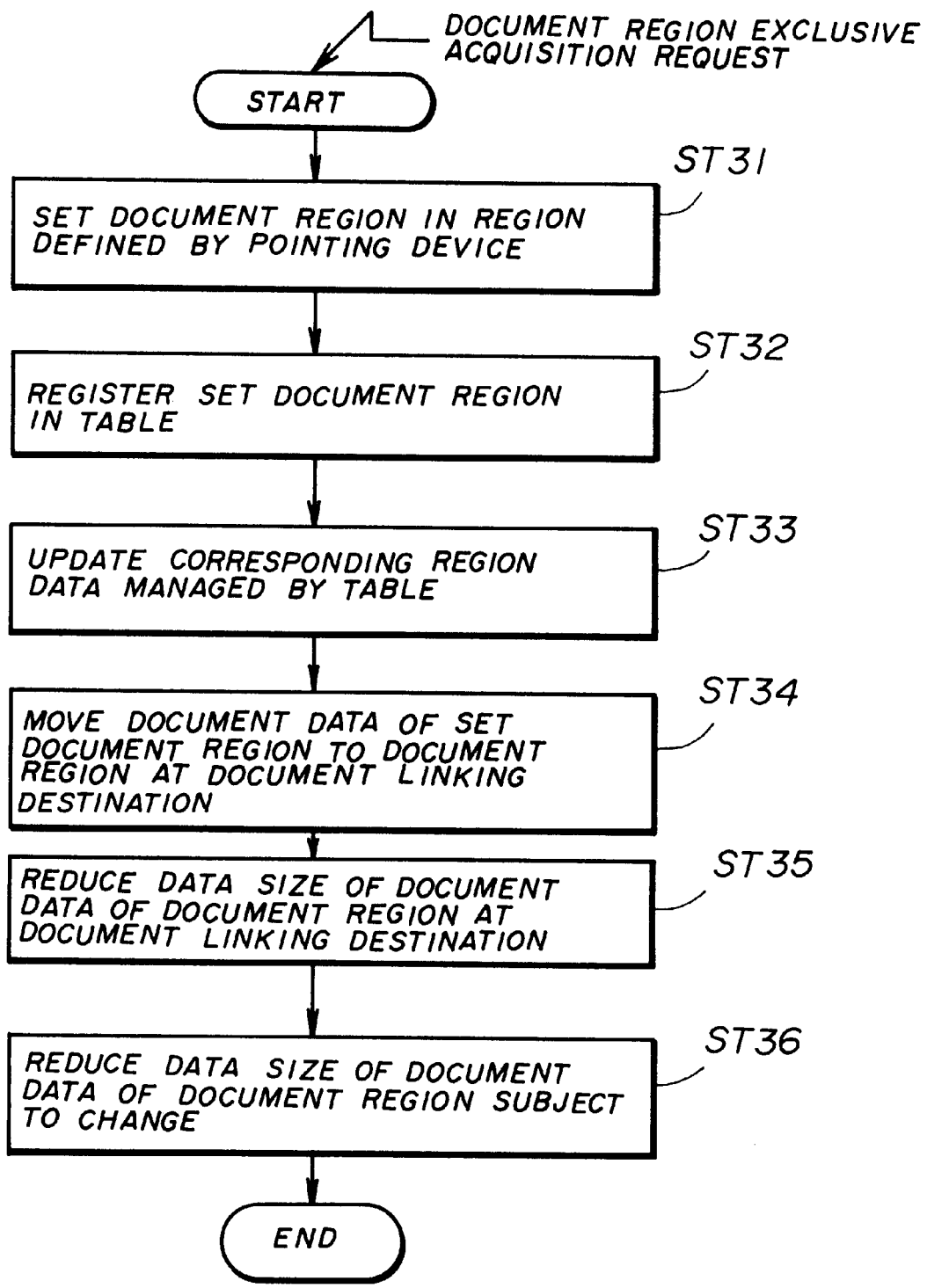
FIG. 14 is a flow chart for explaining the operation of the document creating mechanism responsive to a document region exclusive acquisition request.

Next, a description will be given of the operation of the document creating mechanism 33 when the user issues a document region exclusive acquisition request when the document create process is being carried out, by referring to FIG. 14. FIG. 14 is a flow chart for explaining the operation of the document creating mechanism 33 responsive to the document region exclusive acquisition request.

In FIG. 14, when the document region exclusive acquisition request is issued by the user when the document create process is being carried out by the document creating mechanism 33, a step ST31 sets a new document region from the created document in the region which is defined by the pointing device 32. For example, the step ST31 sets the document region indicated by the dotted lines in FIG. 5A.

A step ST32 opens an entry in the region management table 37, and registers the region data of the document region which is set in the step ST31, so as to register the set document region in the region management table 37. When setting a new attribute with respect to the set document region, this new attribute is also set in the step ST31 so that the new attribute can be registered in the entry opened in the step ST32.

Then, a step ST33 specifies the document region which is subject to change, that is, reduction, due to the document region which is set in the step ST31, and updates the region data of this specified document region to be registered in the region management table 37 depending on the change.

A step ST34 moves the document data of the document region which is set in the step ST31 to a document region at a document linking destination. This move process is carried out by renewing the pointer to the document data to be registered in the region management table 37.

Next, a step ST35 makes a reference to the region management table 37 and specifies the document data of the document region at the document linking destination. Further, the specified document data are reduced depending on the change that is introduced due to the document region which is set in the step ST31.

A step ST36 makes a reference to the region management table 37 and specifies the document data in the document region which is specified in the step ST33 and is subject to the change. The specified document data are reduced depending on the change that is introduced due to the document region which is set in the step ST31, and the process ends.

Accordingly, by carrying out the operation shown in FIG. 14, the user can acquire, in a document, a document region in which no character is input, after inputting the document, as shown in FIGS. 5A and 5B, so that document data can be added in the acquired document region.

Figure 15:
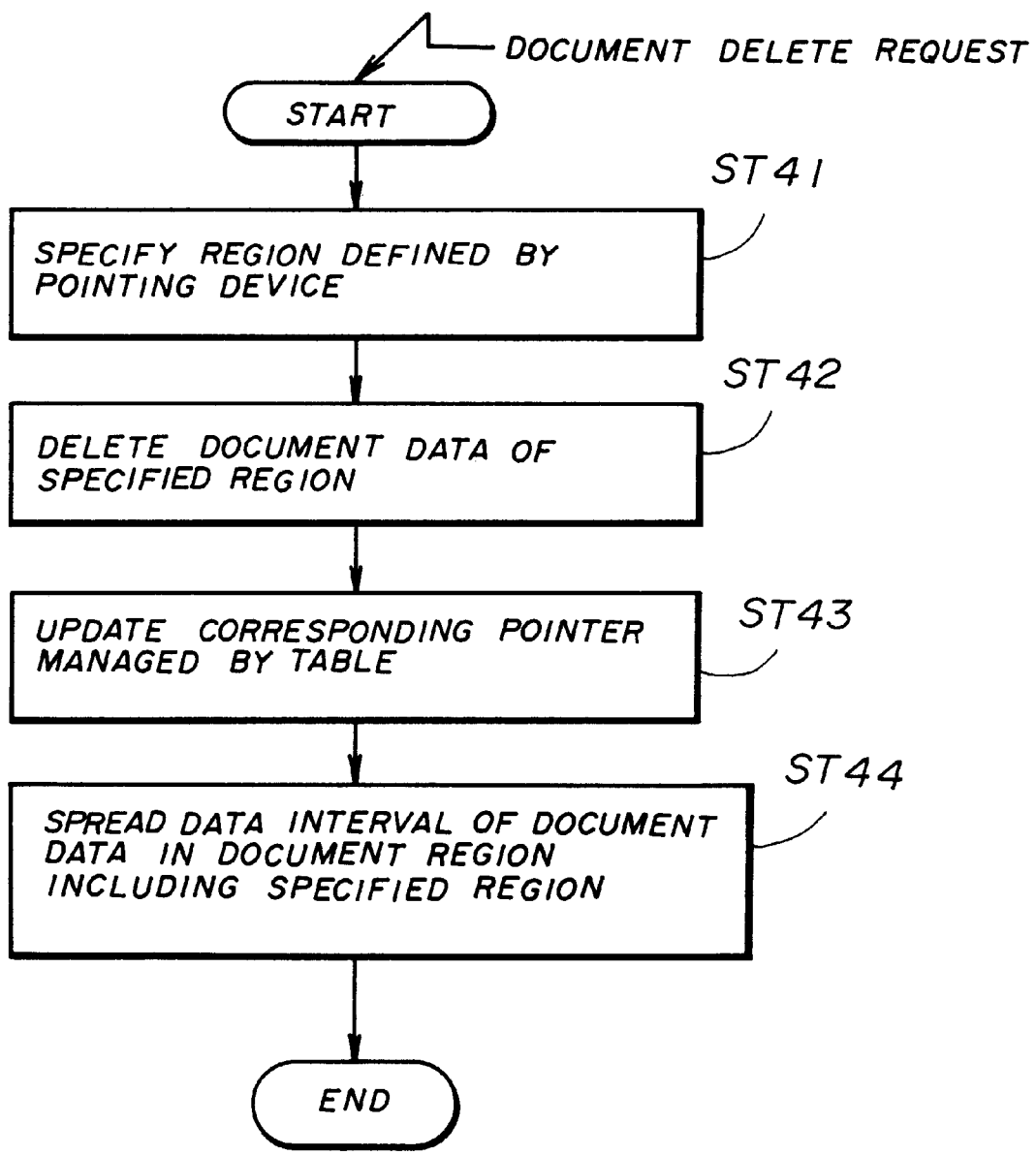
FIG. 15 is a flow chart for explaining the operation of the document creating mechanism responsive to a document delete request.

Next, a description will be given of the operation of the document creating mechanism 33 when the user issues a document delete request when the document create process is being carried out, by referring to FIG. 15. FIG. 15 is a flow chart for explaining the operation of the document creating mechanism 33 responsive to the document delete request.

In FIG. 15, when the document delete request is issued by the user when the document create process is being carried out by the document creating mechanism 33, a step ST41 specifies a region which is defined by the pointing device 32 from the created document. For example, the step ST41 specifies the region indicated by the dotted lines in FIG. 6A.

A step ST42 deletes the document data in the region which is specified in the step ST41.

Then, a step ST43 specifies a document region which includes the region which is specified in the step ST41, and updates the pointer of the specified document region to be registered in the region management table 37. This pointer points to the document data of the specified document region. In other words, the pointer to the document data to be registered in the region management table 37 is updated in correspondence with the document data delete process carried out in the step ST41.

A step ST44 spreads the data interval of the document data of the document region which is specified in the step ST43 depending on the document data deletion, and the process ends.

Therefore, by carrying out the operation shown in FIG. 15, the user can freely delete a portion of a document after inputting the document, as shown in FIGS. 6A and 6B, so that it is possible to acquire a region between documents element which are not deleted delete a region in which document element such as characters can be input, thereby enabling addition of document data in the acquired region.

In the embodiment described above, it is of course possible to narrow the data interval of the document data instead of reducing the data size of the document data. In addition, instead of enlarging the data size of the document data, it is possible to widen the data interval of the document data.

In addition, the handwritten document data input device 30 shown in FIG. 7 is not essential to the present invention, and any document or data input means such as a keyboard may be used to create the document. When the keyboard is used, the document is created by a known means based on code data input from the keyboard.

Further, the present invention is not limited to these embodiments, but various variations and modifications may be made without departing from the scope of the present invention.

What is claimed is:

1. A document processing apparatus which displays a created document on a display screen and carries out an editing process with respect to the created document in response to an instruction from a pointing device which points on the display screen, said document processing apparatus comprising:
   a detecting device detecting whether a document region change request which requests a change of a document region is issued;
   a changing device, responsive to said detecting device, changing a first document region on the display screen defined by said pointing device to a prescribed region defined by said pointing device in response to said detecting device detecting issuance of the document region change request; and
   an adjusting device, responsive to said changing device, adjusting a data size and a data interval of a document element in a second document region, which is subject to change due to the change in the first document region made by said changing device, corresponding to the change in the first document region, to enable addition of a document to a created document using a free format,
      both said first and second document regions being displayed within a common display region having a fixed size regardless of the change in the first document region.

2. A document processing apparatus which displays a created document on a display screen and carries out an editing process with respect to the created document in response to an instruction from a pointing device which points on the display screen, said document processing apparatus comprising:
   a detecting device detecting whether a document region acquisition request which requests acquisition of a document region is issued;
   a setting device, responsive to said detecting device, setting a first document region in a region defined by said pointing device when said detecting device detects issuance of the document region acquisition request;
   a changing device, responsive to said setting device, changing the first document region set by said setting device to a prescribed region defined by said pointing device; and
   an adjusting device, responsive to said changing device, adjusting a data size and a data interval of a document element in a second document region, which is subject to change due to the change in the first document region made by said changing device, corresponding to the change in the first document region to enable addition of a document to a created document using a free format,
      both said first and second document regions being displayed within a common display region having a fixed size regardless of the change in the first document region.

3. A document processing apparatus which displays a created document on a display screen and carries out an editing process with respect to the created document in response to an instruction from a pointing device which points on the display screen, said document processing apparatus comprising:
   a detecting device detecting whether a document region exclusive acquisition request which requests exclusive acquisition of a document region is issued;
   a setting device, responsive to said detecting device, setting a first document region having no document element in a region defined by said pointing device when said detecting device detects issuance of the document region exclusive acquisition request;
   a moving device, responsive to said setting device, moving a first document element which is excluded by the first document region set by said setting device to a second document region at a document linking destination while adjusting one of a data size and a data interval of the first document; and
   an adjusting device, responsive to said moving device, adjusting a data size and a data interval of a second document in a third document region, which is subject to change due to the first document region set by said setting device, corresponding to the change in the first document region, to enable addition of a document to a created document using a free format,
      all of said first, second and third document regions being displayed within a common display region having a fixed size regardless of the change in the first document region.

4. A document processing apparatus which displays a created document on a display screen and carries out an editing process with respect to the created document in response to an instruction from a pointing device which points on the display screen, said document processing apparatus comprising:
   a detecting device detecting whether a document element delete request which requests deletion of a document element is issued;
   a specifying device, responsive to said detecting device, specifying a region defined by said pointing device when said detecting device detects issuance of the document element delete request;
   a deleting device, responsive to said specifying device, deleting a first document element in the region specified by said specifying device; and
   an adjusting device, responsive to said deleting device, adjusting a data size and a data interval of a second document element in a document region including the region specified by said specifying device, corresponding to the first document element deleted by said deleting device, to enable addition of a document to a created document using a free format,
      both said regions specified by said specifying device and said document region being displayed within a display region having a fixed size regardless of the deletion of the first document element.

5. A computer program product having a computer readable medium having computer program logic recorded thereon for performing document processing which displays a created document on a display screen and carries out an editing process with respect to the created document in response to an instruction from a pointing device which points on the display screen, said computer program product comprising:

detecting means for detecting whether a document region change request which requests a change of a document region is issued;

changing means, responsive to said detecting means, for changing a first document region on the display screen defined by said pointing device to a prescribed region defined by said pointing device when said detecting means detects issuance of the document region change request; and adjusting means, responsive to said changing means, for adjusting a data size and a data interval of a document element in a second document region, which is subject to change due to the change in the first document region made by said changing means, corresponding to the change in the first document region, to enable addition of a document to a created document using a free format, both said first and second document regions being displayed within a common display region having a fixed size regardless of the change in the first document region.

6. A computer program product having a computer readable medium having computer program logic recorded thereon for performing document processing which displays a created document on a display screen and carries out an editing process with respect to the created document in response to an instruction from a pointing device which points on the display screen, said computer program product comprising:

detecting means for detecting whether a document region acquisition request which requests acquisition of a document region is issued;

setting means, responsive to said detecting means, for setting a first document region in a region defined by said pointing device when said detection means detects issuance of the document region acquisition request;

changing means, responsive to said setting means, for changing the first document region set by said setting means to a prescribed region defined by said pointing device; and adjusting means, responsive to said changing means, for adjusting a data size and a data interval of a document element in a second document region, which is subject to change due to the change in the first document region made by said changing means, corresponding to the change in the first document region, to enable addition of a document to a created document using a free format, both said first and second document regions being displayed within a common display region having a fixed size regardless of the change in the first document region.

7. A computer program product having a computer readable medium having computer program logic recorded thereon for performing document processing which displays a created document on a display screen and carries out an editing process with respect to the created document in response to an instruction from a pointing device which points on the display screen, said computer program product comprising:

detecting means for detecting whether a document region exclusive acquisition request which requests exclusive acquisition of a document region is issued;

setting means, responsive to said detecting means, for setting a first document region having no document element in a region defined by said pointing device when said detecting means detects issuance of the document region exclusive acquisition request;

moving means, responsive to said setting means, for moving a first document element which is excluded by the first document region set by said setting means to a second document region at a document linking destination while adjusting one of a data size and a data interval of the first document; and adjusting means, responsive to said moving means, for adjusting a data size and a data interval of a second document element in a third document region, which is subject to change due to the first document region set by said setting means, corresponding to the change in the first document region, to enable addition of a document to a created document using a free format, all of said first, second and third document regions being displayed within a common display region having a fixed size regardless of the change in the first document region.

8. A computer program product having a computer readable medium having computer program logic recorded thereon for performing document processing which displays a created document on a display screen and carries out an editing process with respect to the created document in response to an instruction from a pointing device which points} on the display screen, said computer program product comprising:

detecting means for detecting whether a document element delete request which requests deletion of a document element is issued;

specifying means, responsive to said detecting means, for specifying a region defined by said pointing device when said detecting means detects issuance of the document element delete request;

deleting means, responsive to said specifying means, for deleting a first document element in the region specified by said specifying means; and adjusting means, responsive to said deleting means, for adjusting a data size and a data interval of a second document element in a document region including the region specified by said specifying means, corresponding to the first document element deleted by said deleting means, to enable addition of a document to a created document using a free format, both said regions specified by said specifying device and said document region being displayed within a display region having a fixed size regardless of the deletion of the first document element.

* * * * *

UNITED STATES PATENT AND TRADEMARK OFFICE
CERTIFICATE OF CORRECTION

PATENT NO.      : 6,397,233 B1
DATED           : May 28, 2002
INVENTOR(S)     : Toru Okawa et al.

It is certified that error appears in the above-identified patent and that said Letters Patent is hereby corrected as shown below:

Column 13,
Line 48, change "region;" insert -- region, so that all of the document element in the second document region is displayed on the display screen even though the size of the second document region is adjusted --.

Column 14,
Line 10, after "region" insert -- so that all of the document element in the second document region is displayed on the display screen even though the size of the second document region is adjusted --.
Line 31, after "document" insert -- element --.
Line 34, after "document" (first occurrence) insert -- element --.
Line 42, after "region" insert --, so that all of the document element in the second document region is displayed on the display screen even though the size of the second and third document regions are adjusted --.

Column 15,
Line 2, after "element" insert -- , so that all of the document element in the second document region is displayed on the display screen even though the size of the document region is adjusted --.
Lines 32 and 63, after "region" insert -- , so that all of the document element in the second document region is displayed on the display screen even though the size of the second document region is adjusted --.

UNITED STATES PATENT AND TRADEMARK OFFICE
CERTIFICATE OF CORRECTION

PATENT NO. : 6,397,233 B1
DATED : May 28, 2002
INVENTOR(S) : Toru Okawa et al.

It is certified that error appears in the above-identified patent and that said Letters Patent is hereby corrected as shown below:

<u>Column 16,</u>
Line 33, after "region" insert -- , so that all of the first and second document elements in the second and third document regions are displayed on the display screen even though the size of the second and third document region are adjusted --.
Line 63, after "element" insert -- , so that all of the document element is displayed even though the size of the first document region is changed --.

Signed and Sealed this

Twenty-seventh Day of May, 2003

JAMES E. ROGAN
*Director of the United States Patent and Trademark Office*